United States Patent
Izuta et al.

(10) Patent No.: US 7,730,474 B2
(45) Date of Patent: Jun. 1, 2010

(54) STORAGE SYSTEM AND AUTOMATIC RENEWAL METHOD OF FIRMWARE

(75) Inventors: Hiroshi Izuta, Odawara (JP); Seiki Morita, Odawara (JP); Atsushi Ishikawa, Minami-ashigara (JP)

(73) Assignee: Hitachi, Ltd., Tokyo (JP)

( * ) Notice: Subject to any disclaimer, the term of this patent is extended or adjusted under 35 U.S.C. 154(b) by 1263 days.

(21) Appl. No.: 11/225,092

(22) Filed: Sep. 14, 2005

(65) Prior Publication Data

US 2007/0016901 A1 Jan. 18, 2007

(30) Foreign Application Priority Data

Jul. 14, 2005 (JP) ............................. 2005-205201

(51) Int. Cl.
*G06F 9/44* (2006.01)
*G06F 9/445* (2006.01)
(52) U.S. Cl. ...................... 717/168; 717/174
(58) Field of Classification Search ......... 717/168–178; 713/2; 714/48
See application file for complete search history.

(56) References Cited

U.S. PATENT DOCUMENTS

| | | | | |
|---|---|---|---|---|
| 6,971,095 B2* | 11/2005 | Hirai et al. | .................. | 717/173 |
| 7,228,538 B1* | 6/2007 | Burton et al. | ................ | 717/170 |
| 7,373,551 B2* | 5/2008 | Rothman et al. | ............... | 714/30 |
| 2003/0037282 A1* | 2/2003 | Berg et al. | ..................... | 714/11 |
| 2004/0205779 A1* | 10/2004 | Almeida et al. | ............. | 719/321 |
| 2005/0022064 A1* | 1/2005 | Steinmetz et al. | ............. | 714/42 |
| 2005/0149924 A1* | 7/2005 | Komarla et al. | ............. | 717/176 |
| 2005/0229173 A1* | 10/2005 | Mihm et al. | ................. | 717/171 |
| 2006/0015861 A1* | 1/2006 | Takata et al. | ................. | 717/168 |
| 2006/0075276 A1* | 4/2006 | Kataria et al. | ................... | 714/4 |
| 2006/0259756 A1* | 11/2006 | Thompson et al. | ............. | 713/2 |
| 2007/0006001 A1* | 1/2007 | Isobe et al. | ................. | 713/300 |

FOREIGN PATENT DOCUMENTS

JP 2005-071042 8/2003

OTHER PUBLICATIONS

Sun Microsystems, Inc., "Sun StorEdge T3 Array Controller Upgrade Manual", Jun. 2001, Sun Microsystems, Inc, Revision A, p. 10, 14-16.*

* cited by examiner

*Primary Examiner*—Wei Y Zhen
*Assistant Examiner*—Chung Cheng
(74) *Attorney, Agent, or Firm*—Foley & Lardner LLP

(57) ABSTRACT

When the main power source is turned on, a storage system creates a revision table for storing the revision of main firmware installed in a resource management processor of the storage system. Next, the main firmware is loaded from a system drive into a cache memory. When the revision of the main firmware installed in the resource management processor is old, this main firmware is renewed to the main firmware loaded into the cache.

15 Claims, 13 Drawing Sheets

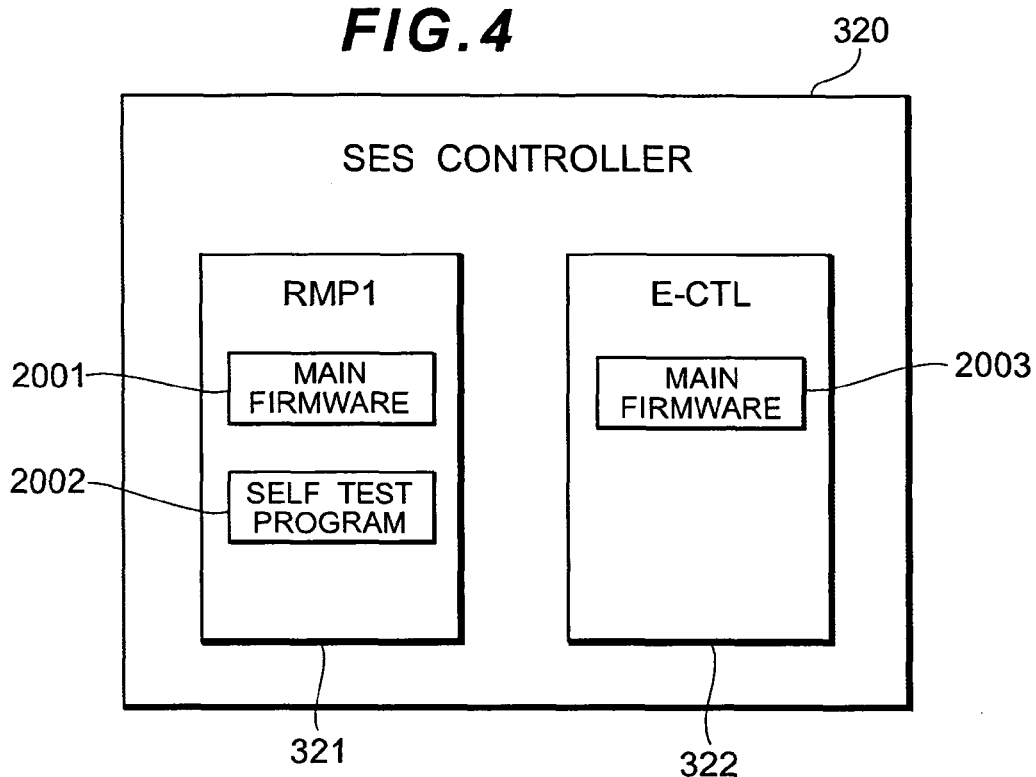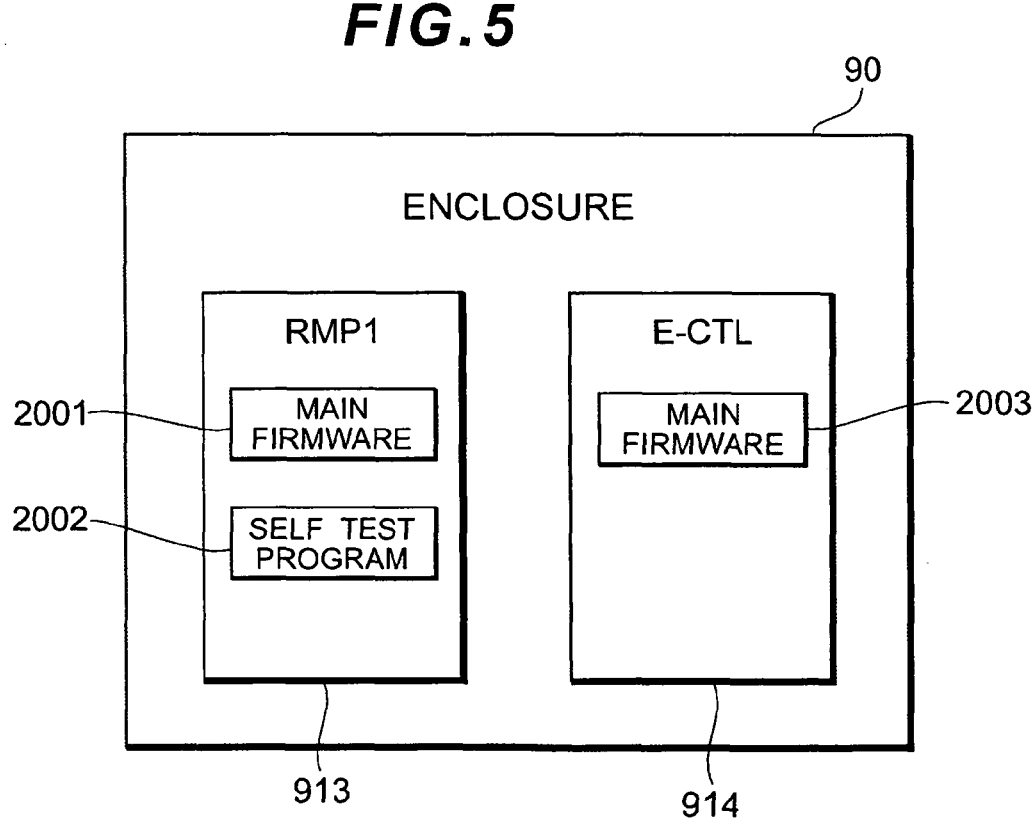

FIG.9

REVISION TABLE 3010

| UNIT NUMBER | CLASSIFICATION | MODEL | #ENC | RMP1 | RMP2 | FC/SATA |
|---|---|---|---|---|---|---|
| 0 | DKC | NEW MODEL | 0 | A2 | — | — |
|   |   |   | 1 | A2 | — | — |
| 1 | FC | NEW MODEL | 0 | A1 | — | — |
|   |   |   | 1 | A1 | — | — |
| 2 | AT | OLD MODEL | 0 | — | B2 | C1 |
|   |   |   | 1 | — | B2 | C2 |

STORAGE SYSTEM AND AUTOMATIC RENEWAL METHOD OF FIRMWARE

CROSS-REFERENCES TO RELATED APPLICATIONS

This application relates to and claims priority from Japanese Patent Application No. 2005-205201, filed on Jul. 14, 2005, the entire disclosure of which is incorporated herein by reference.

BACKGROUND

The present invention relates to a storage system and its automatic renewal method of firmware.

With a database system that handles enormous amounts of data such as in a data center, data is managed with a storage system configured separately from a host computer. This storage system, for example, is configured from a disk array device or the like. A disk array device is configured by arranging numerous storage devices in an array and, for instance, is created based on RAID (Redundant Array of Independent Inexpensive Disks). At least one or more logical volumes are formed on the physical storage area provided by a storage device group, and this logical volume is provided to the host system. The host system is able to perform write access and read access to the logical volume. Meanwhile, after this kind of storage system is placed on the market, it is necessary to renew the firmware when defects are discovered in such firmware installed in the components of the storage system.

Incidentally, Japanese Patent Laid-Open Publication No. 2005-71042 refers to the automatic download of firmware.

SUMMARY

Nevertheless, since a storage system is not deployed at the maintenance site where the service parts are to be deployed, it is not easy to renew the firmware installed in the components deployed as service parts to an improved version. Under existing circumstances, the renewal process is complex since all components deployed as service parts must be collected and replaced with an improved version, or the revision of firmware installed in the components deployed as service parts must be confirmed upon replacing such components.

The present invention was devised in view of the foregoing problems, and an object thereof is to facilitate the renewal of firmware installed in the components deployed as service parts to an improved version.

In order to achieve the foregoing object, the storage system of the present invention has a controller for responding to an I/O request from a host system and controlling the input and output of data to and from a storage device; a resource management processor for managing a chassis resource; and a system drive for storing main firmware of the resource management processor. The controller performs comparative determination for comparing the revision of the main firmware installed in the resource management processor and the revision of the main firmware stored in the system drive and, when the revision of the main firmware installed in the resource management processor is older than the revision of the main firmware stored in the system drive, renews the main firmware installed in the resource management processor to the main firmware stored in the system drive.

When the storage system further has an FC/SATA converter, for the main firmware of the FC/SATA converter also, the controller performs comparative determination for comparing the revision of the main firmware installed in the FC/SATA converter and the revision of the main firmware stored in the system drive and, when the revision of the main firmware installed in the FC/SATA converter is older than the revision of the main firmware stored in the system drive, renews the main firmware installed in the FC/SATA converter to the main firmware stored in the system drive.

As the opportunity for performing comparative determination of the revision of main firmware, for instance, at the time when the main power source is turned on, when a chassis is added to the storage system, when the controller is replaced, when the main firmware stored in the system drive is renewed, when the resource management processor is replaced, when the FC/SATA converter is replaced and so on may be considered. When the storage system is in an online state, the comparative determination may also be periodically repeated.

According to the present invention, when the revision of main firmware installed in the storage system is old, since this will be automatically renewed to the firmware of a new revision, the maintenance management of the storage system is facilitated thereby.

DESCRIPTION OF THE DRAWINGS

FIG. 4 is a firmware configuration of an SES controller;

FIG. 5 is a firmware configuration of an enclosure;

FIG. 9 is an explanatory diagram showing the contents of a revision table;

DETAILED DESCRIPTION

Embodiments of the present invention are now explained with reference to the drawings.

Figure 1:
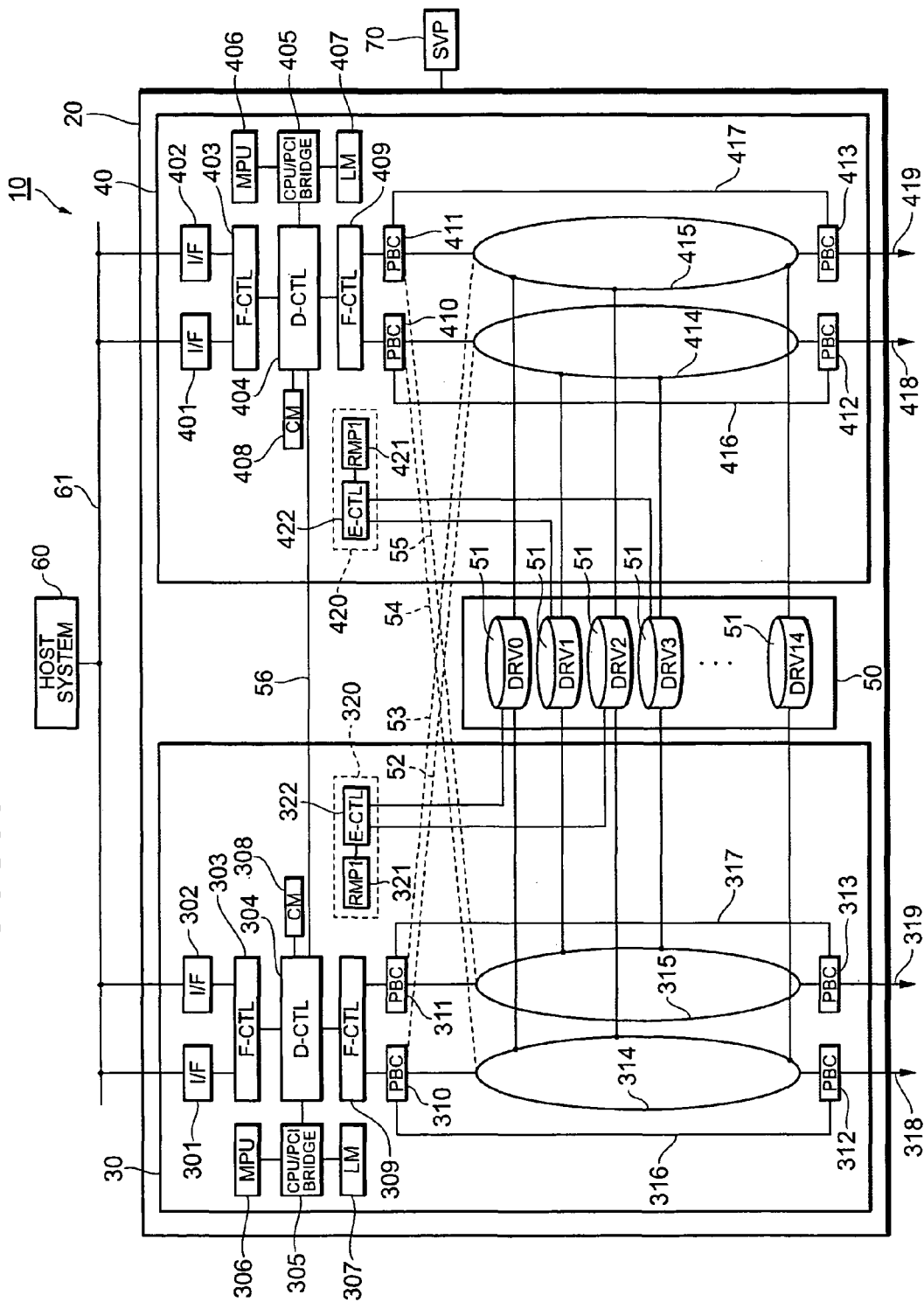
FIG. 1 is a system configuration of a basic chassis of a storage system according to the present embodiment.

FIG. 1 shows the system configuration of a basic chassis 20 of a storage system 10 pertaining to the present embodiment. The storage system 10 may be configured from a single piece of the basic chassis 20, or configured by connecting one or a plurality of expanded chassis to the basic chassis 20. Details regarding the expanded chassis will be explained later.

The storage system 10 is connected to one or a plurality of host systems 60 via a communication network 61. The host system 60, for instance, is a business-use server system, workstation, mainframe, personal computer or the like. As the communication network 61, for example, SAN (Storage Area Network), LAN (Local Area Network), Internet, dedicated line, public line or the like may be used. When the host system 60 is connected to the storage system 10 via a SAN, the host system 60, according to a fibre channel protocol, requests the data input/output in block units, which is a data management unit of the storage resource of the storage system 10. When the host system 60 is connected to the storage system 10 via a LAN, the host system 60 designates a file name and requests the data input/output in file units based on a protocol such as NFS (Network File System). In order to receive the file access request from the host system 60, it is necessary to equip the storage system 10 with a NAS (Network Attached Storage) function.

The basic chassis 20 has a plurality of FC (Fiber Channel) disk drives 51, and controllers 30, 40 for controlling the data input/output to and from the plurality of FC disk drives 51.

The controllers 30, 40 are able to control the plurality of FC disk drives 51 in a RAID level (0, 1, 5 for example) prescribed in a so-called RAID system. In a RAID system, the plurality of FC disk drives 51 are managed as a single RAID group. A plurality of logical volumes, which are access units from the host system 60, are defined on the RAID group. A LUN (Logical Unit Number) is assigned to each logical volume. The controllers 30, 40 and the plurality of FC disk drives 51 are connected via a backboard 50.

The controller 30 has host interfaces (I/F) 301, 302, an FC controller (F-CTL) 303, a data controller (D-CTL) 304, a CPU/PCI bridge 305, a main processor (MPU) 306, a local memory (LM) 307, a cache memory (CM) 308, an FC controller (F-CTL) 309, port bypass circuits (PBC) 310, 311, 312, 313, FC-ALs (Fibre Channel Arbitrated Loop) 314, 315, FC paths 316, 317, 318, 319 and an SES (SCSI Enclosure Service) controller 320.

The main processor 306 controls the I/O processing (write access or read access) to and from the plurality of FC disk drives 51 in response to the I/O request from the host system 60. The local memory 307 stores various programs (main micro source file, etc.) of the main processor 306, and also functions as the work area of the main processor 306. The CPU/PCI bridge 305 mutually connects the main processor 306, local memory 307 and data controller 304. The cache memory 308 is a buffer memory for temporarily storing the data to be written in the FC disk drives 51, or the read data read from the FC disk drives 51. The cache memory 308 has a power source backup, and is configured as an involatile memory for preventing the loss of cache data even when there is a power source failure in the storage system 10.

The FC controller 303 is a controller for controlling the host interface and, for instance, has a function of receiving the block access request from the host system 60 based on the fibre channel protocol. Meanwhile, the FC controller 309 is a controller for controlling the back interface, and controls the data input/output to and from the plurality of FC disk drives 51. The data controller 304 mutually connects the CPU/PCI bridge 305, cache memory 308 and FC controllers 303, 309, and controls the data transfer between the host system 60 and FC disk drives 51. Specifically, the data controller 304, in response to the write access from the host system 60, writes the write data (dirty data) received from the host system 60 in the cache memory 308. Thereafter, at the stage when the write data is accumulated to a certain degree in the cache memory 308, the data controller 304 asynchronously writes the write data thereof in the FC disk drives 51. Meanwhile, the data controller 304, in response to the read access from the host system 60, writes the read data read from the FC disk drives 51 in the cache memory 308, and forwards this to the host system 60.

The FC controller 309 is connected to FC-ALs 314, 315 via port bypass circuits 310, 311, respectively. The FC-AL 314 is connected to even-numbered FC disk drives 51. The FC-AL 315 is connected to odd-numbered FC disk drives 51. When there is a loop failure in the FC-AL 314, the port bypass circuit 310 is able to switch the destination from the FC-AL 314 to the FC path 316. Similarly, when there is a loop failure in the FC-AL 315, the port bypass circuit 311 is able to switch the destination from the FC-AL 315 to the FC path 317. When an expanded chassis is connected to the basic chassis 20, the port bypass circuit 312 connects the FC-AL 314 to the subsequent stage FC path 318, and the port bypass circuit 313 connects the FC-AL 315 to the subsequent stage FC path 319.

The SES controller 320 has a resource management processor (RMP1) 321 and an enclosure controller (E-CTL) 322.

The resource management processor 321 monitors and controls the resources of the basic chassis (controller 30, power source, battery, fan unit, panel switch, voltage monitor, panel LED, warning LED, etc.). For example, the resource management processor 321 monitors the voltage of the system based on a voltage monitor to detect an abnormal voltage. Or, the resource management processor 321 monitors the temperature of the controller 30 to detect an abnormal temperature. Or, the resource management processor 321 adjusts the system temperature by controlling the rotating speed of the fan unit. Or, the resource management processor 321 controls the blinking of the panel LED or warning LED. Or, the resource management processor 321 monitors the status of the battery.

The enclosure controller 322 controls the SES drive. The SES drive has the function of SES or ESI (Enclosure Service I/F) prescribed in a SCSI3 standard. In the present embodiment, among the plurality of FC disk drives 51, the four FC disk drives DRV0, DRV1, DRV2, DRV3 are SES drives. The enclosure controller 322 is communicably connected to the FC disk drives DRV0, DRV2. The main processor 306 is able to acquire SES information by accessing the SES controller 320 via the SES drive. SES information includes monitoring information on resources of the basic chassis (for instance, temperature monitoring information, power source monitoring information, communication failure information, connection information of expanded chassis, etc.) or revision information of main firmware to be installed in the resource management processors 321, 421.

Meanwhile, the controller 40 has host interfaces (I/F) 401, 402, a FC controller (F-CTL) 403, a data controller (D-CTL) 404, a CPU/PCI bridge 405, a main processor (MPU) 406, a local memory (LM) 407, a cache memory (CM) 408, a FC controller (F-CTL) 409, port bypass circuits (PBC) 410, 411, 412, 413, FC-ALs 414, 415, FC paths 416, 417, 418, 419 and an SES controller 420. The SES controller 420 has a resource management processor (RMP1) 421 and an enclosure controller (E-CTL) 422. The enclosure controller 422 is communicably connected to the FC disk drives DRV1, DRV3. Since the configuration of the controller 40 is the same as the configuration of the controller 30, the detailed description thereof is omitted.

The data controllers 304, 404 of the respective controllers 30, 40 are connected via a data bus 56, and the data transfer is controlled such that the same data is written in duplicate in two cache memories 308, 408. Further, when the FC disk drives 51 are to be managed at RAID level 5, the data controllers 304, 404 operate the parity data.

The port bypass circuits 310, 311, 410, 411 are connected to the FC-ALs 414, 415, 314, 315 via the alternate paths 52, 53, 54, 55, respectively. For instance, when there is a failure in the controller 30, the I/O request from the host system 60 received by the controller 30 is succeeded by the controller 40 via the alternate paths 52, 53.

The basic chassis 20 is connected to the management terminal (SVP) 70 for maintaining and managing the system. By operating the management terminal 70, a customer engineer may, for instance, set the logical volume defined on the FC disk drives 51, add or delete a FC disk drive 51, change the setting of the RAID configuration (for example, change the setting from RAID level 5 to RAID level 1), and so on. Further, the main firmware of the resource management processors 321, 421 can also be sent from the management terminal 70 to the cache memories 308, 408. The management terminal 70 may be built in the basic chassis 20, or may be configured to be provided externally.

Figure 2:
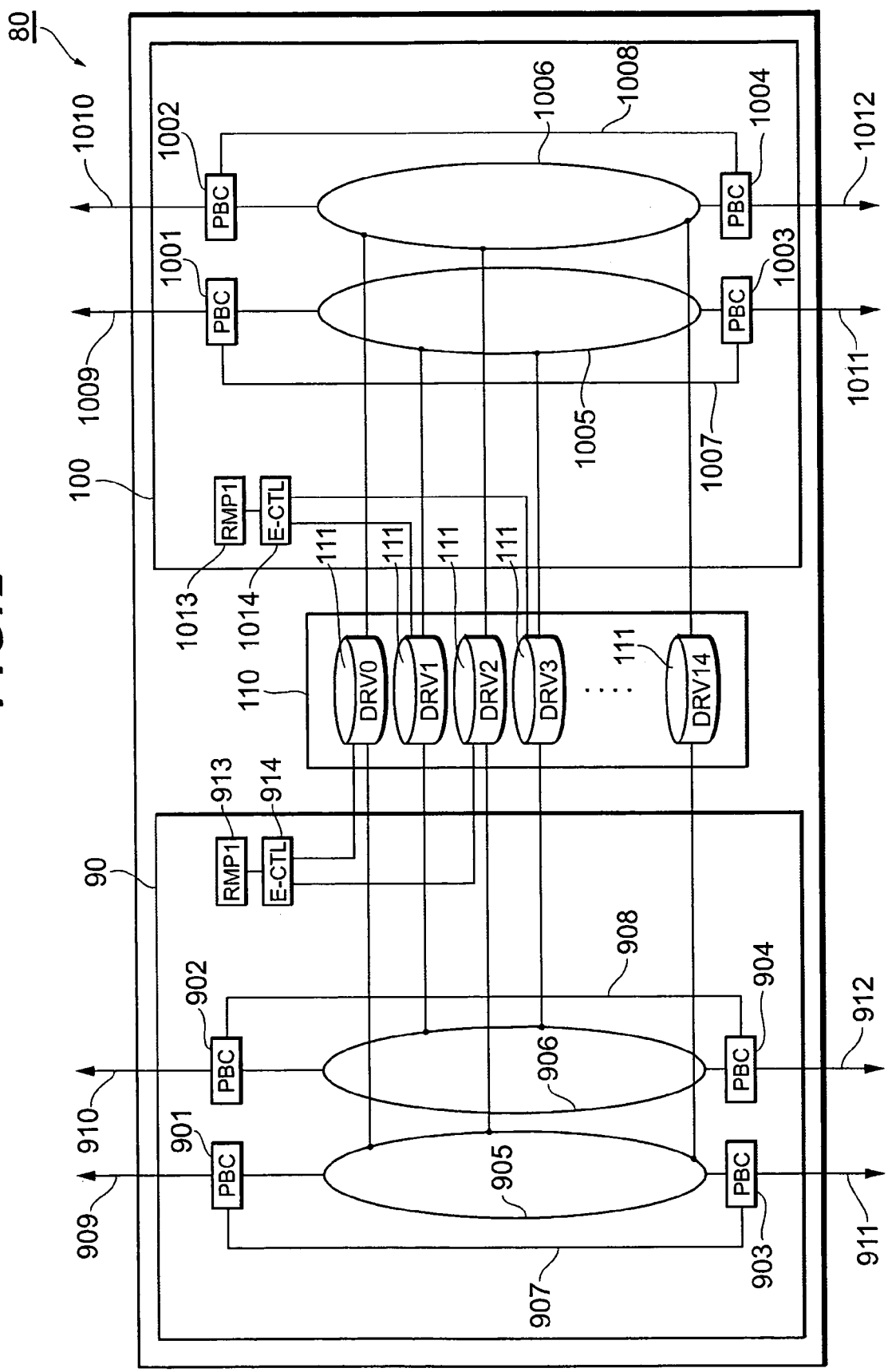
FIG. 2 is a system configuration of an expanded chassis 80 of a storage system according to the present embodiment.

FIG. 2 shows the system configuration of an expanded chassis to be connected to the storage system 10 of the present embodiment. The expanded chassis 80 has enclosures 90, 100 and a plurality of FC disk drives 111. The enclosures 90, 100 and the plurality of FC disk drives 111 are connected via a backboard 110. The enclosures 90, 100 monitor and control the resources of the expanded chassis (power source, battery, fan unit, panel switch, voltage monitor, panel LED, warning LED, etc.).

The enclosure 90 has port bypass circuits (PBC) 901, 902, 903, 904, FC-ALs 905, 906, FC paths 907, 908, 909, 910, 911, 912, a resource management processor (RMP1) 913 and an enclosure controller (E-CTL) 914.

Each of the port bypass circuits 901, 902, 903, 904 is connected to the basic chassis 20 or another expanded chassis via FC paths 909, 910, 911, 912. The FC-AL 905 is connected to the even-numbered FC disk drives 111. The FC-AL 906 is connected to the odd-numbered FC disk drives 111. When there is a loop failure in the FC-AL 905, the port bypass circuit 901 is able to switch the destination from the FC-AL 905 to the FC path 907. Similarly, when there is a loop failure in the FC-AL 906, the port bypass circuit 902 is able to switch the destination from the FC-AL 906 to the FC path 908.

The resource management processor 913 monitors and controls the resources of the expanded chassis (enclosure 90, power source, battery, fan unit, panel switch, voltage monitor, panel LED, warning LED, etc.). For instance, the resource management processor 913 monitors the voltage of the system based on a voltage monitor to detect an abnormal voltage. Or, the resource management processor 913 monitors the temperature of the enclosure 90 to detect an abnormal temperature. Or, the resource management processor 913 adjusts the system temperature by controlling the rotating speed of the fan unit. Or, the resource management processor 913 controls the blinking of the panel LED or warning LED. Or, the resource management processor 913 monitors the status of the battery.

The enclosure controller 914 controls the SES drive. In the present embodiment, among the plurality of FC disk drives 111, the four FC disk drives DRV0 DRV1, DRV2, DRV3 are SES drives. The enclosure controller 914 is communicably connected to the FC disk drives DRV0, DRV2. The main processor 306 of the basic chassis 20 is able to acquire SES information by accessing the resource management processor 913 from FC-ALs 905, 906 via the SES drive. SES information includes monitoring information of the resources of the expanded chassis (for instance, temperature monitoring information, power source monitoring information, communication failure information, connection information of expanded chassis, etc.) or revision information of main firmware to be installed in the resource management processor 913.

Meanwhile, the enclosure 100 has port bypass circuits (PBC) 1001, 1002, 1003, 1004, FC-ALs 1005, 1006, FC paths 1007, 1008, 1009, 1010, 1011, 1012, a resource management processor (RMP1) 1013 and an enclosure controller (E-CTL) 1014. The enclosure controller 1014 is communicably connected to the FC disk drives DRV1, DRV3. Since the configuration of the enclosure 100 is the same as the configuration of the enclosure 90, the detailed description thereof is omitted.

Figure 3:
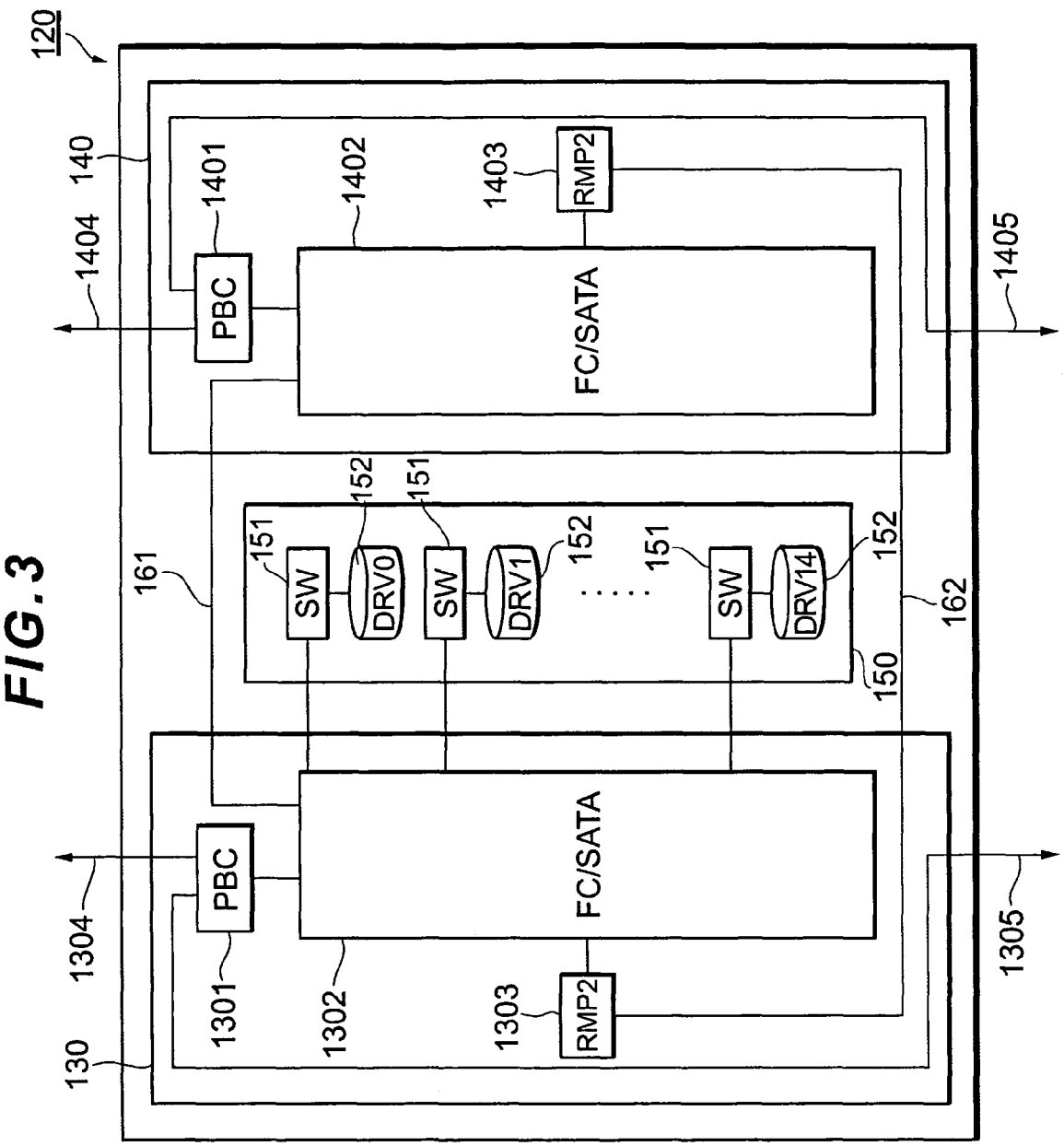
FIG. 3 is a system configuration of an expanded chassis 120 of a storage system according to the present embodiment.

FIG. 3 shows the system configuration of an expanded chassis 120 to be connected to the storage system 10 of the present embodiment. The expanded chassis 120 has routers 130, 140, and a plurality of SATA (Serial Advanced Technology Attachment) disk drives 152. The routers 130, 140 and the plurality of SATA disk drives 152 are connected via a backboard 150. The routers 130, 140 enable the transparent access between an FC protocol and SATA protocol, and also monitor and control the resources of the expanded chassis (power source, battery, fan unit, panel switch, voltage monitor, panel LED, warning LED, etc.).

The router 130 has a port bypass circuit (PBC) 1301, an FC/SATA converter 1302, a resource management processor (RMP2) 1303 and FC paths 1304, 1305.

The port bypass circuit 1301 is connected to the basic chassis 20 or another expanded chassis via the FC paths 1304, 1305. The FC/SATA converter 1302 has a function of converting the FC protocol into SATA protocol, and a function of converting the SATA protocol into FC protocol. Thereby, the controllers 30, 40 of the basic chassis 20 will recognize the SATA disk drive 152 as though it is directly connected in the FC loop. The FC/SATA converter 1302 is connected to the even-numbered SATA disk drives 152 via a path switch 151. The path switch 151 has two ports, and, although it is usually connected to an operating path, when there is a failure, it switches to a standby path based on the control of the FC/SATA converter 1302.

The resource management processor 1303 monitors and controls the resources of the expanded chassis (router 130, power source, battery, fan unit, panel switch, voltage monitor, panel LED, warning LED, etc.). For instance, the resource management processor 1303 monitors the voltage of the system based on a voltage monitor to detect an abnormal voltage. Or, the resource management processor 1303 monitors the temperature of the router 130 to detect an abnormal temperature. Or, the resource management processor 1303 adjusts the system temperature by controlling the rotating speed of the fan unit. Or, the resource management processor 1303 controls the blinking of the panel LED or warning LED. Or, the resource management processor 1303 monitors the status of the battery. The main processor 306 of the basic chassis 20 is able to acquire SES information by accessing the resource management processor 1303. SES information includes monitoring information on resources of the basic chassis (for instance, temperature monitoring information, power source monitoring information, communication failure information, connection information of expanded chassis, etc.) or revision information of main firmware to be installed in the resource management processor 1303.

Meanwhile, the router 140 has a port bypass circuit (PBC) 1401, an FC/SATA converter 1402, a resource management processor (RMP2) 1403 and FC paths 1404, 1405. The FC/SATA converter 1402 is connected odd-numbered SATA disk drives 152 via a path switch 151. Since the configuration of the router 140 is the same as the configuration of the router 130, the detailed description thereof is omitted.

The routers 130, 140 are connected via an internal path 161, and the I/O request from the host system 60 can be routed between the routers 130, 140. For example, when the router 130 receives from the host system 60 an access to the logical volume to be processed by the router 140, the I/O request received by the router 130 can be implemented with the router 140 via the internal path 161 by requesting the router 140 to perform such processing.

Further, the resource management processors (RMP2) 1303, 1403 are connected via a hotline 162, and they each can block or reboot the other.

FIG. 4 shows the firmware configuration of the SES controller 320. The resources management processor 321 is loaded with main firmware 2001 for the resource management processor, and a self test program 2002. The enclosure controller 322 is loaded with main firmware 2003 for the enclosure controller. The firmware configuration of the SES controller 420 is also the same.

FIG. 5 shows the firmware configuration of the enclosure 90. The resource management processor 913 is loaded with main firmware 2001 for the resource management processor, and a self test program 2002. The enclosure controller 914 is loaded with main firmware 2003 for the enclosure controller. The firmware configuration of the enclosure 100 is also the same.

Figure 6:
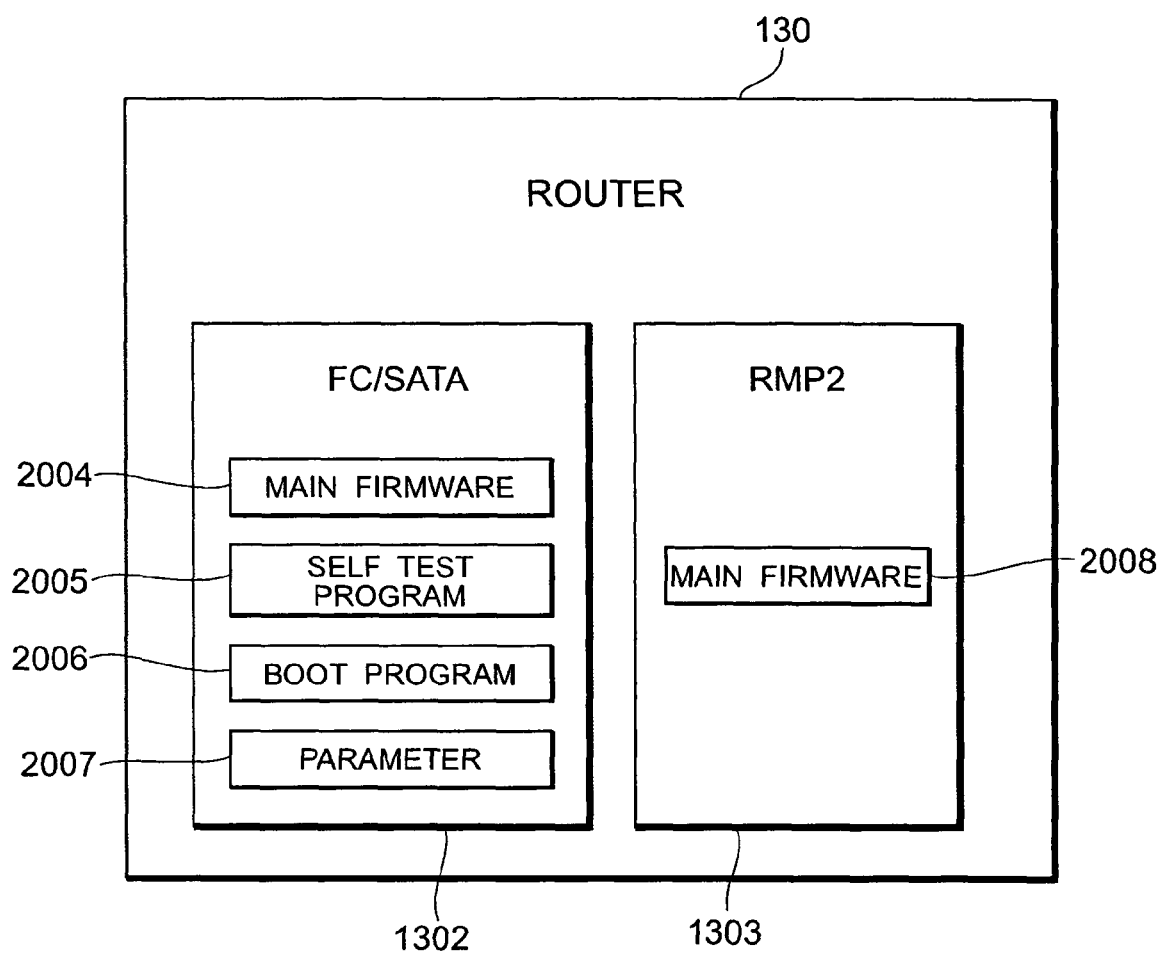
FIG. 6 is a firmware configuration of a router.

FIG. 6 shows the firmware configuration of the router 130. The FC/SATA converter 1302 is loaded with main firmware 2004 for the FC/SATA converter, a self test program 2005, a boot program 2006, and various parameters 2007. The resource management processor 1303 is loaded with main firmware 2008 for the resource management processor. The firmware configuration of the router 140 is also the same.

Among the firmware described above, the main firmware 2001, 2004, 2008 can be renewed via the automatic download of the present embodiment. Details regarding the automatic download will be described later.

Incidentally, since the self test programs 2002, 2005, boot program 2006 and parameters 2007 can be renewed offline, these are not subject to the automatic download in the present embodiment. Further, since a fundamental logical circuit is built in the enclosure controllers 322, 914, it would hardly be useful to renew the main firmware 2003. Thus, in the present embodiment, the main firmware 2003 for the enclosure controller will not be subject-to the automatic download. Nevertheless, the self test programs 2002, 2005, boot program 2006, parameters 2007 and main firmware 2003 may also be subject to the automatic download.

Figure 7:
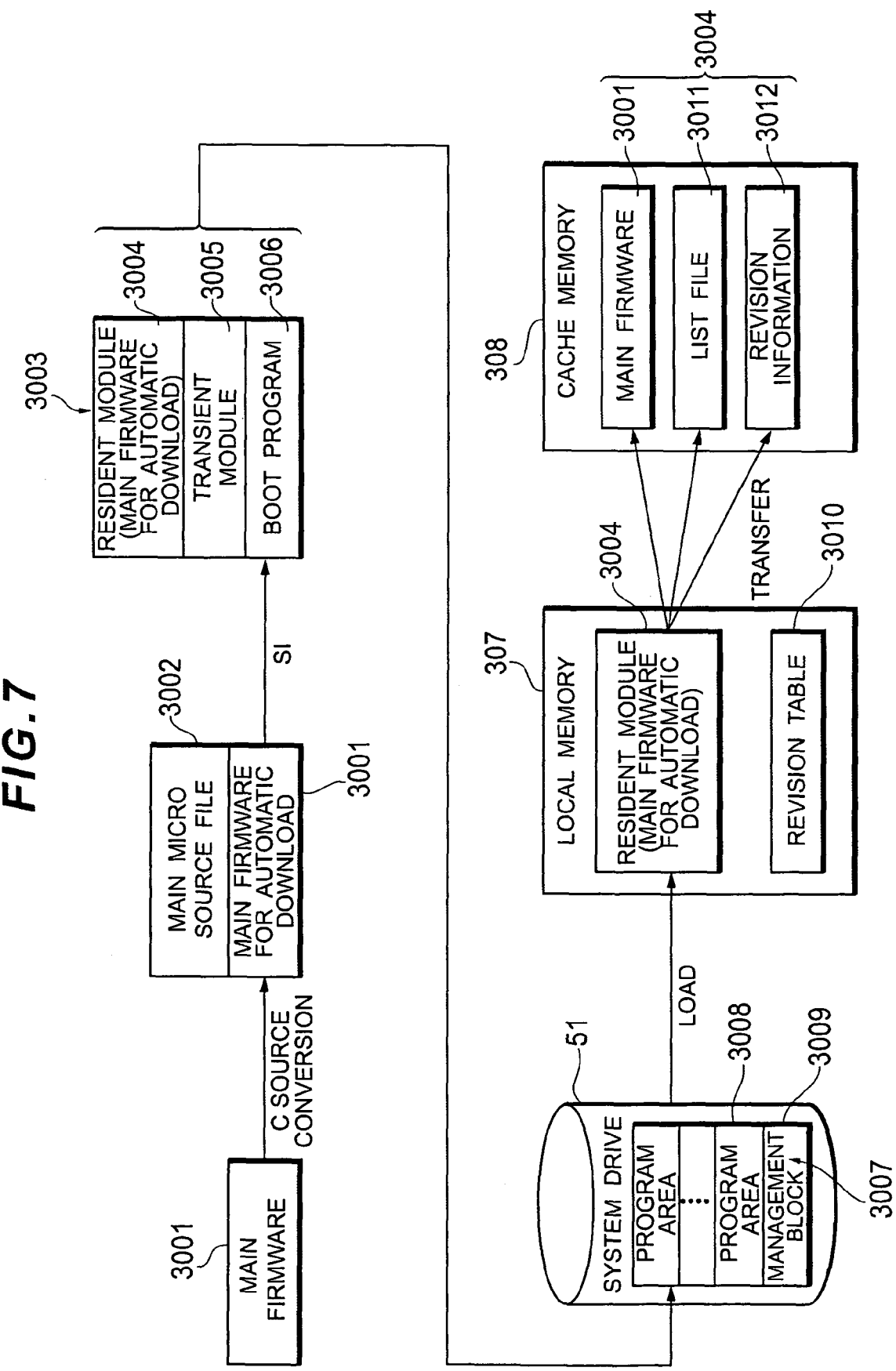
FIG. 7 is a diagram showing the outline of the automatic download of the main firmware.

FIG. 7 shows the outline of the automatic download of main firmware. The low from creating an automatic download file to renewing the main firmware is now explained with reference to FIG. 7. Foremost, the main firmware 3001 for automatic download including the foregoing main firmware 2001, 2004, 2008 is subject to C source conversion, and this is added to the main micro source file 3002 for the main processors 306, 406 of the basic chassis 20 then subject to SI in order to create an installation file 3003. The installation file 3003 includes a resident module 3004, a transient module 3005 and a boot program 3006. The resident module 3004 includes a main micro source file 3002, and main firmware 3001 for automatic download. The installation file 3003 is installed in a system area 3007 of the FC disk drives 51 of the basic chassis 20. In the present embodiment, among the plurality of FC disk drives 51, five FC disk drives 51 are used as the system drive, and the same installation file 3003 is installed in the system area 3007 of the respective system drives. The system area 3007 includes a program area 3008 for storing the installation file 3003, and a management block 3009 for storing management information.

When the main power source of the basic chassis 20 is turned on and the device is activated, the resident module 3004 is read from the system area 3007 and stored in the local memory 307. The local memory 307 further stores the revision table 3010. The revision table 3010 contains revision information of the main firmware 2001, 2004, 2008 installed in the SES controllers 320, 420 of the basic chassis 20, the enclosures 90, 100 of the expanded chassis 80, or the routers 130, 140 of the expanded chassis 120. The method of creating the revision table 3010 is described later.

The resident module 3004 stored in the local memory 307 is divided into the main firmware 3001, list file 3011 indicating the file names of each main firmware 2001, 2004, 2008 included in the main firmware 3001, and revision information 3012 of each main firmware 2001, 2004, 2008.

The main processors 306, 406 performs comparative determination of comparing the revision table 3010 and revision information 3012, downloads the main firmware when the revision of the main firmware 2001, 2004, 2008 installed in the SES controllers 320, 420 of the basic chassis 20, enclosures 90,100 of the expanded chassis 80, or the routers 130, 140 of the expanded chassis 120 is older than the revision information 3012, and renews the main firmware of the old revision to the main firmware of the new revision.

Figure 8:
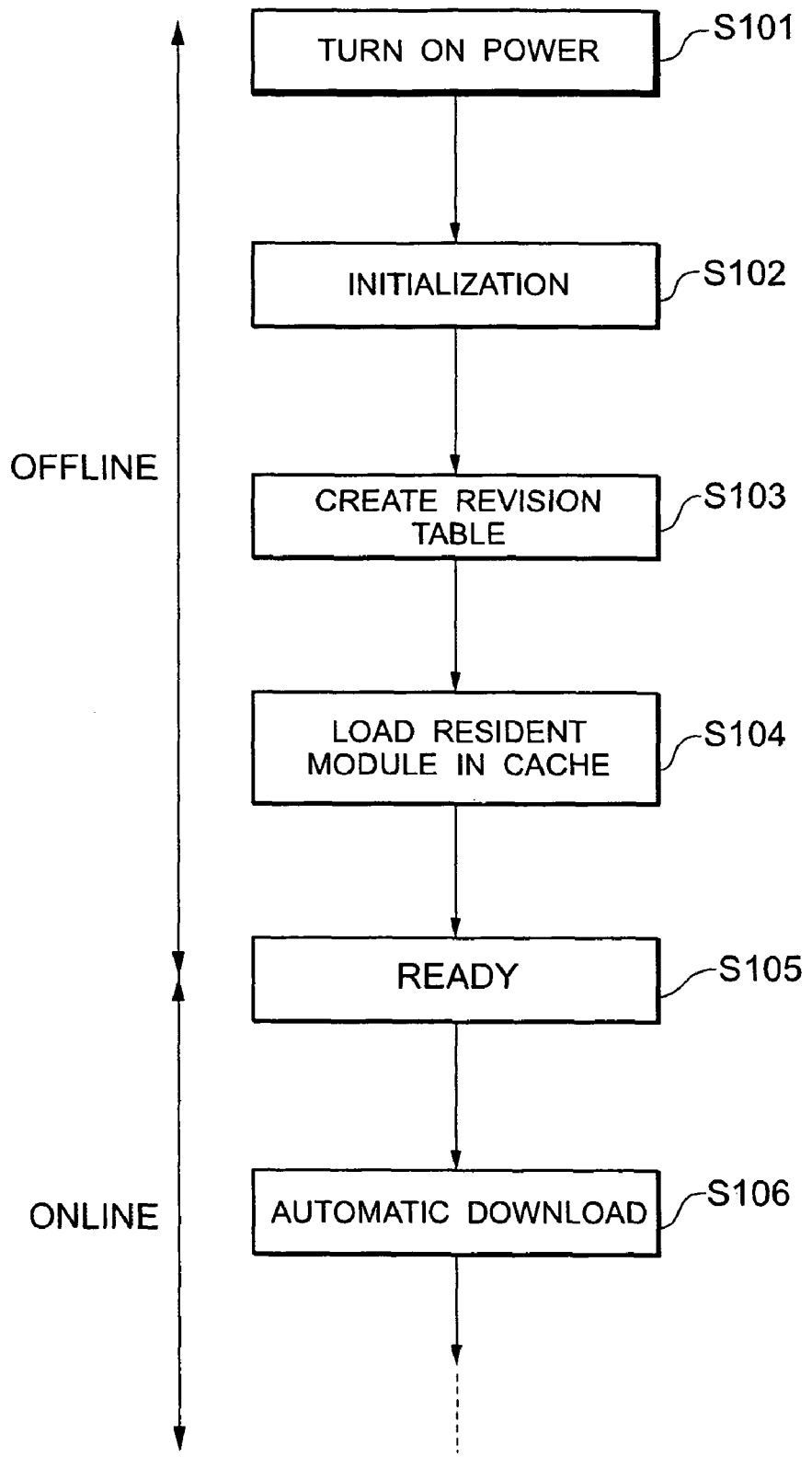
FIG. 8 is a flowchart showing the processing steps for automatically downloading the main firmware upon activating the device.

FIG. 8 is a flowchart showing the processing steps for automatically downloading the main firmware upon activating the device. The automatic download upon activating the device is now explained with reference to FIG. 8. Foremost, when the power source is turned on (S101), the storage system 10 performs initialization (S102), and then creates the revision table 3010 (S103). Next, the resident module 3004 is read from the system area 3007, and the main firmware 3001, list file 3011 and revision information 3012 are stored in the cache memory 308 (S104). When the storage system 10 is activated normally, the system enters a Ready state (S105). When the revision of the main firmware 2001, 2004, 2008 installed in the SES controllers 320, 420 of the basic chassis 20, the enclosures 90, 100 of the expanded chassis 80, or the routers 130, 140 of the expanded chassis 120 is older than the revision information 3012, the automatic download of the main firmware is performed (S106).

Meanwhile, when the revision of the main firmware 2001, 2004, 2008 installed in the SES controllers 320, 420 of the basic chassis 20, the enclosures 90, 100 of the expanded chassis 80, or the routers 130, 140 of the expanded chassis 120 is the same as or newer than the revision information 3012, the automatic download of the main firmware is not performed.

Incidentally, when the storage system 10 is not activated normally, the system enters a Warning state, and the automatic download of the main firmware 2001, 2004, 2008 is not performed. In the following explanation, the time before the storage system 10 enters the Ready state is referred to as an offline state, and the time after entering the Ready state is referred to as an online state. In an offline state, although the storage system 10 is not able to respond to the I/O request from the host system 60, if it is in an online state, the storage system 10 is able to respond to the I/O request from the host system 60.

FIG. 9 shows the contents of the revision table 3010. In the present embodiment, unit number 0 is assigned to the basic chassis 20, and unit numbers 1, 2, 3, . . . are assigned to the expanded chassis 80 or 120. In the example illustrated in FIG. 9, the expanded chassis 80 and expanded chassis 120 are connected to the basic chassis 20. Unit number 1 is assigned to the expanded chassis 80 to be connected to the basic chassis 20. Unit number 2 is assigned to the expanded chassis 120 to be connected to the expanded chassis 80.

Classification information is information for distinguishing the basic chassis 20 and expanded chassis 80, 120. "DKC" represents the basic chassis 20, "FC" represents the expanded chassis 80, and "AT" represents the expanded chassis 120.

Model information is information for distinguishing a new model and an old model. For instance, in consideration of a case where the main firmware 2001, 2004, 2008 subject to downloading in a new model will not be subject to downloading in an old model, the basic chassis 20 and expanded chassis 80, 120 are distinguished as an old model or a new model, respectively. For instance, there may be a case where the old model is designed so that only the main firmware 2004 of the FS/SATA converters 1302, 1402 mounted on the expanded chassis 120 is subject to the automatic download, and the new model is designed so that all main firmware 2001, 2004, 2008 are subject to the automatic download. Since which main firmware should be subject to the automatic download is a matter of design, this is not limited to the foregoing example.

The "0" of #ENC represents the controller 30 regarding the basic chassis 20, and "1" represents the controller 40. The "0" of #ENC represents the enclosure 90 regarding the expanded chassis 80, and "1" represents the enclosure 100. The "0" of #ENC represents the router 130 regarding the expanded chassis 120, and "1" represents the router 140.

RMP1 represents the resource management processors 321, 421, 913, 1013. RMP2 represents the resource management processors 1303, 1403. FC/SATA represents the FC/SATA converters 1302, 1402. A1, A2, B2, C1, C2 in FIG. 9 represent the revision of the main firmware 2001, 2004, 2008. For instance, the revision of the main firmware 2001 installed respectively in the resource management processors 321, 421 of the controllers 30, 40 of the basic chassis 20 is A2. The revision of the main firmware 2001 installed respectively in the resource management processors 913, 1013 of the enclosures 90, 100 of the expanded chassis 80 is A1. The revision of the main firmware 2008 installed respectively in the resource management processors 1303,1403 of the routers 130, 140 of the expanded chassis 120 is B2. The revision of the main firmware 2004 installed in the FC/SATA converter 1302 of this chassis 120 is C1, and the revision of the main firmware 2004 installed in the FC/SATA converter 1402 is C2.

The revision table 3010 is created by the main processors 306, 406, upon the activation of the device, accessing the SES controllers 320, 420 of the basic chassis 20, the enclosures 90, 100 of the expanded chassis 80, and the routers 130, 140 of the expanded chassis 120 and acquiring the revision information of the main firmware 2001, 2004, 2008.

Figure 10:
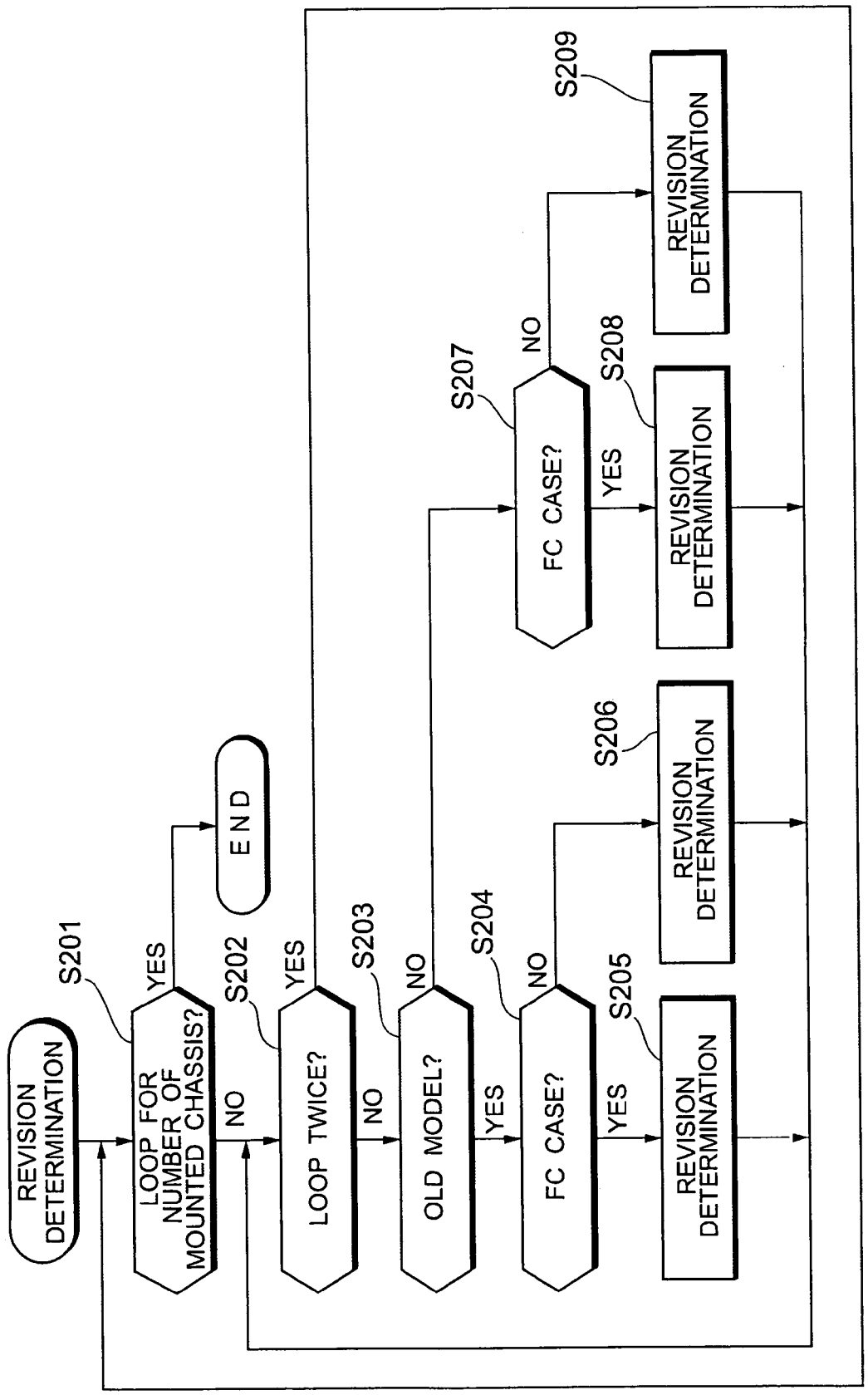
FIG. 10 is a flowchart showing the creation processing of a revision table.

FIG. 10 is a flowchart showing the processing steps for creating the revision table 3010. The procedures for creating the revision table 3010 are now explained with reference to FIG. 10. Foremost, one is counted each time the loop processing of S202 to S209 described later is performed, and whether the count number is equal to the number of chassis is determined (S201). The number of chassis is to total number of chassis including the basic chassis 20 and the expanded chassis 80 or 120.

When the count is less than the number of chassis (S201; NO), whether the loop processing of S203 to S209 has been repeated twice is determined (S202). The reason for repeating the loop processing of S203 to S209 twice is because there are a total of two SES controllers 320, 420 installed in the basic chassis 20, a total of two enclosures 90, 100 installed in the expanded chassis 80, and a total of two routers 130, 140 installed in the expanded chassis 120.

When the loop processing of S203 to S209 has been performed less than twice (S202; NO), whether each chassis is an old model is determined (S203). Whether each chassis is an old model or a new model can be determined by accessing each chassis via SES and acquiring SES information.

When the chassis is an old model (S203; YES), whether this chassis is an FC chassis is determined (S204). An FC chassis is a chassis, such as the basic chassis 20 or expanded chassis 80, loaded with FC disk drives. When the chassis is an FC chassis (S204; YES), revision of the main firmware 2001 is determined (S205), and, when it is not an FC chassis (S204; NO), revision of the main firmware 2004, 2008 is determined (S206).

Meanwhile, when the chassis is a new model (S203; NO), whether this chassis is an FC chassis is determined (S207). When the chassis is an FC chassis S207; YES), revision of the main firmware 2001 is determined (S208), and, when it is not an FC chassis (S207; NO), revision of the main firmware 2004, 2008 is determined (S209).

Figure 11:
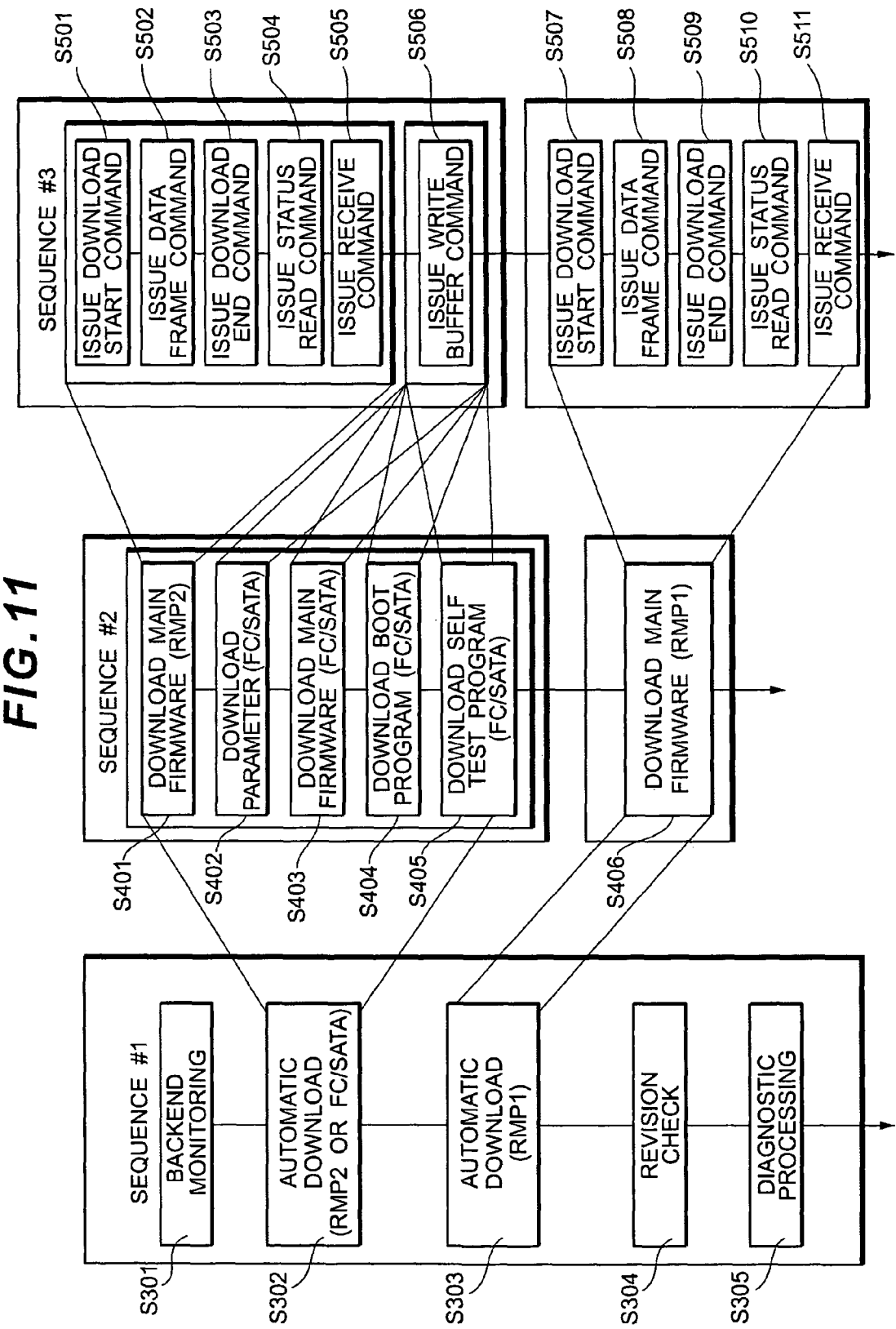
FIG. 11 is a flowchart showing the automatic download processing of the main firmware.

FIG. 11 is a flowchart showing the automatic download processing of the main firmware. As shown in FIG. 11, the automatic download processing has a three-step program sequence. In sequence #1, interface control with the enclosures 90, 100 and routers 130, 140 is performed (S301 to S305). In sequence #2, the download sequence of the main firmware 2001, 2004, 2008 is performed (S401 to S406). In sequence #3, the command issue sequence is performed (S501 to S511).

When the system enters a Ready state, the main processors 306, 406 perform backend monitoring (S301). Backend monitoring includes the monitoring of basic chassis resources and resources of the expanded chassis (for example, temperature monitoring, power source monitoring, communication failure monitoring, expanded chassis connection monitoring, etc.), or the revision check of the main firmware 2001, 2004, 2008. As described above, when the revision of the main firmware 2001, 2004, 2008 installed in the basic chassis 20 and the expanded chassis 80, 120 is older than the revision of the main firmware 2001, 2004, 2008 stored in the system area 3007, foremost, the automatic download of the main firmware 2004, 2008 is performed (S302), and, subsequently, the automatic download of the main firmware 2001 is performed (S303).

Thereafter, the main processors 306, 406 check the revision to confirm whether the automatic download has been performed normally (S304). When the automatic download is performed normally, next, diagnostic processing regarding whether the enclosures 90, 100 can function normally is performed (S305).

In the automatic download processing of the main firmware 2004, 2008 (S302), the automatic download processing of the main firmware 2008 (S401) and the automatic download processing of the main firmware 2004 are performed (S403).

Incidentally, when the system is offline, in addition to the download processing of the main firmware 2004, 2008 (S401, S403), download processing of the parameter 2007 (S402), download processing of the boot program 2006 (S404), and download processing of the self test program 2005 (S405) may also be executed. By transmitting the main firmware 2001, 2004, 2008, parameter 2007, boot program 2006 and self test program 2005 from the management terminal 70 to the expanded chassis 80, the download can be performed offline.

In the automatic download processing of the main firmware 2001 (S303), the automatic download processing of the main firmware 2001 (S406) is performed.

In the automatic download processing of the main firmware 2008 (S401), the main processors 306, 406 issue a download start command to the resource management processors (RMP2) 1303, 1403 (S501) and, by subsequently issuing a data frame command, transmit the main firmware 2008 to the resource management processors (RMP2) 1303, 1403 (S502). Next, the main processors 306, 406 issue a download end command and reboot the resource management processors (RMP2) 1303, 1403 (S503). Next, the main processors 306, 406 issue a status read command and check the status of the resource management processors (RMP2) 1303, 1403 (S504). Finally, the main processors 306, 406 issue a receive command and check whether the automatic download has been completed normally (S505).

In the download processing of the parameter 2007 (S402), download processing of the main firmware 2004 (S403), download processing of the boot program 2006 (S404) and download processing of the self test program 2005 (S405), the main processors 306, 406, after respectively transmitting the parameter 2007, main firmware 2004, boot program 2006 and self test program 2005 to the FC/SATA converters 1302, 1402, issue a write buffer command, and reboot the FC/SATA converters 1302, 1402 (S506).

Even during the automatic download processing of the main firmware 2001 (S406), similarly, the main processors 306, 406 issue a download start command (S507), issue a data frame command (S508), issue a download end command (S509), issue a status read command (S510), and issue a receive command (S511).

Incidentally, although the foregoing explanation illustrated a case of implementing the automatic download of the main firmware 2001, 2004, 2008 at the time when the device is activated, in addition thereto, for example, four events may be used as the opportunity of implementing the automatic download of the main firmware 2001, 2004, 2008.

(1) When a chassis is added with the system in an online state;
(2) When the components of the controller 30, 40 of the basic chassis 20 are replaced with the system in an online state;
(3) When the installation file 3003 of the system area 3007 is renewed with the system in an online state; or
(4) When the SES controllers 320, 420, enclosures 90, 100 and routers 130, 140 are subject to maintenance and replaced with the system in an online state.

Figure 12:
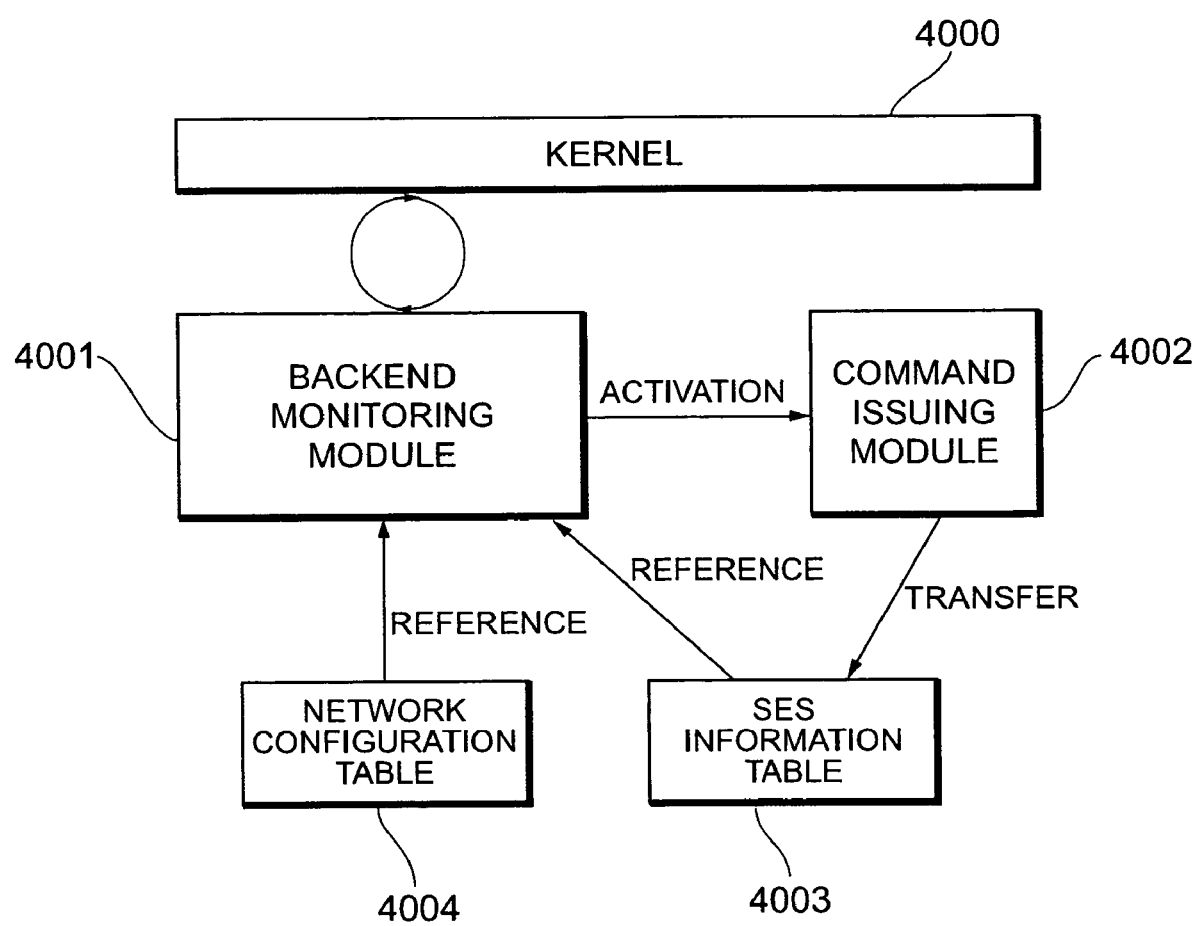
FIG. 12 is an explanatory diagram of a module configuration for monitoring SES information.

FIG. 12 shows the module configuration for monitoring SES information. A kernel 4000 operating on the main processors 306, 406 activates a backend monitoring module 4001 periodically (for instance, in two second intervals) in order to collect SES information. The backend monitoring module 4001 activates a command issue control module 4002. The command issue activation module 4002 issues an SES command to the SES controllers 320, 420 of the basic chassis 20, the enclosures 90, 100 of the expanded chassis 80, or the routers 130, 140 of the expanded chassis 120, and stores the SES information in an SES information collection table 4003. The backend monitoring module 4001 determines whether the revision of the main firmware 2001, 2004, 2008 previously installed in the storage system 10 is new or old by referring to the network configuration table 4004 storing the network configuration (including the revision table 3010) of the storage system 10, and the SES information table 4003 storing SES information. When the four events described above occur, the revision of the main firmware 2001, 2004, 2008 installed in the storage system 10 and the revision of the main firmware 2001, 2004, 2008 contained in the resident module 3004 may not coincide. When the revision of the main firmware 2001, 2004, 2008 previously installed in the storage system 10 is old, the main processors 306, 406 will perform the automatic download of the main firmware 2001, 2004, 2008.

Figure 13:
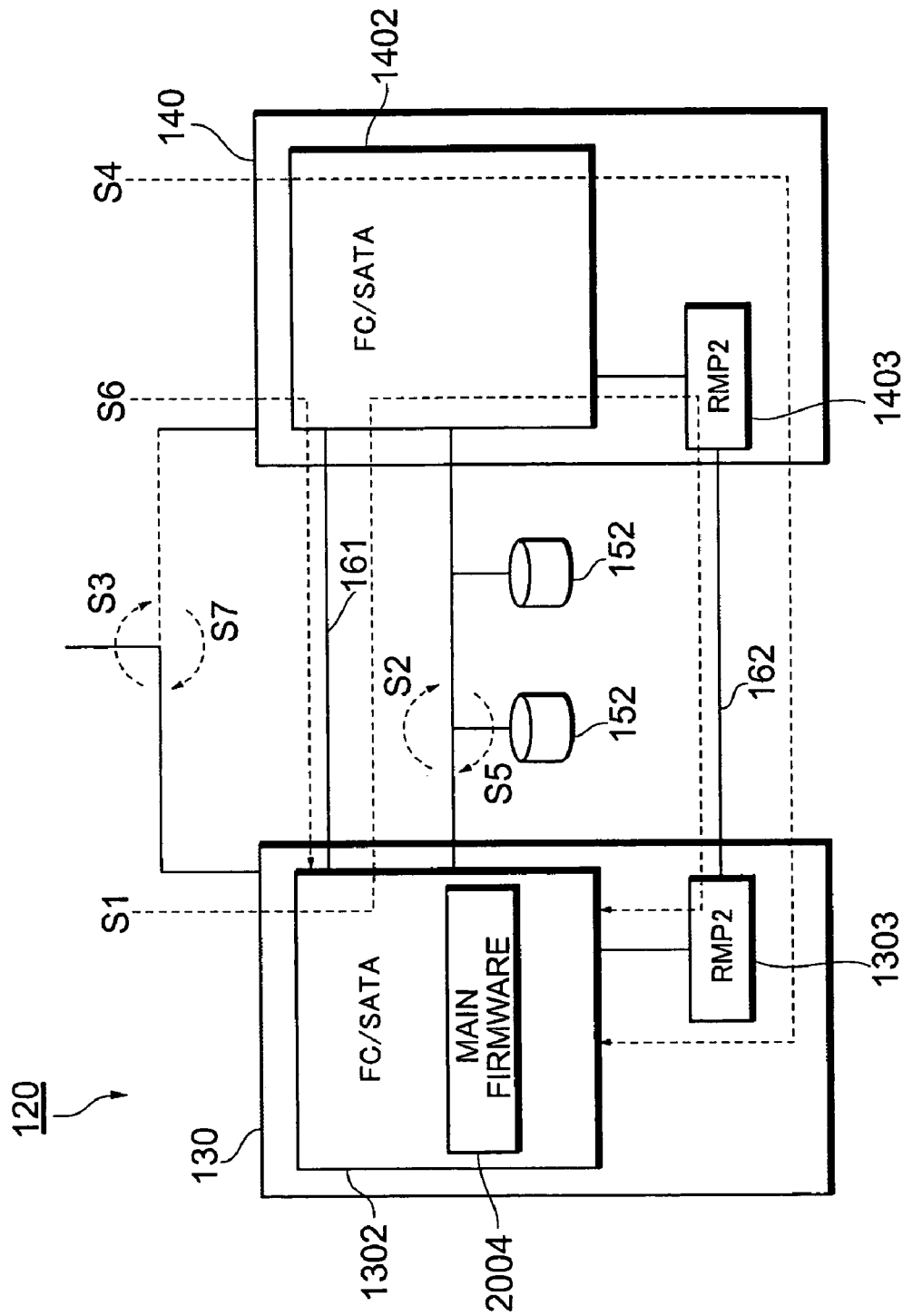
FIG. 13 is an explanatory diagram showing the outline of the loop switch switching processing when automatically renewing the main firmware to be installed in a router.

FIG. 13 shows the outline of the loop switch switching processing upon renewing the main firmware 2004 of the router 130 of the expanded chassis 120 via automatic download. Since the routers 130, 140 constitute a part of the FC loop, for example, upon renewing the main firmware 2004 of the router 130, the FC loop to which the router 130 belongs will become temporarily disabled, and the request from the host system 60 cannot be processed. Thus, in such a case, it is necessary to switch the loop switch to the router 140.

Foremost, in order to block the router 130, a nonresponse command is transmitted from the controller 30 to the resource management processor 1303 via the FC/SATA converter 1302, internal path 161, FC/SATA converter 1402, resource management processor 1403 and hotline 162 (S1). When the resource management processor 1303 becomes nonresponding, a timeout error will occur, this will be judged as a failure in the FC/SATA converter 1302, and the router 130 will be blocked thereby.

Next, the handling of processing of the SATA disk drive 152 that was assigned to the router 130 is switched to the router 140, and a local path fail over is generated (S2). Next, loop switching is implemented (S3), and the I/O request from the host system 60 is implemented with the router 140. Next, at the stage when the automatic download of the main firmware 2004 to the router 130 is completed, a reset cancel signal is transmitted from the controller 40 to the resource management processor 1303 via the FC/SATA converter 1402, resource management processor 1403 and hotline 162 (S4). The FC/SATA converter 1302 is rebooted thereby.

Next, the handling of processing of the SATA disk drive 152 that was assigned to the router 140 is returned to the router 130 (S5), and the diagnosis regarding whether the router 130 will function normally is implemented via the internal path 161 (S6). Next, the chassis resource information and the like in the router 140 is transmitted to the router 130 via the internal path 161, and a common field setting (succession of chassis resource information) is conducted. Finally, loop switching is performed (S7), and the I/O processing to and from the SATA disk drive 152 handled by the router 130 is controlled such that the router 130 will perform such processing once again.

Incidentally, in order to renew the main firmware 2004 of the router 140 via automatic download, a nonresponse command is transmitted from the controller 30 to the resource management processor 1403 via the FC/SATA converter 1302, resource management processor 1303 and hotline 162 in order to block the router 140 and automatically renew the main firmware 2004, and, thereafter, by the resource management processor 1303 transmitting a reset cancel signal to the resource management processor 1403 via the hotline 162, the FC/SATA converter 1402 can be rebooted thereby.

In the foregoing explanation, although a case was illustrated where a nonresponse command is transmitted by the resource management processor 1403 to the resource management processor 1303 via the hotline 162 in order to block the router 130, the FC/SATA converter 1302 can also be rebooted by transmitting a reboot command from the controller 30 to the FC/SATA converter 1302.

Figure 14:
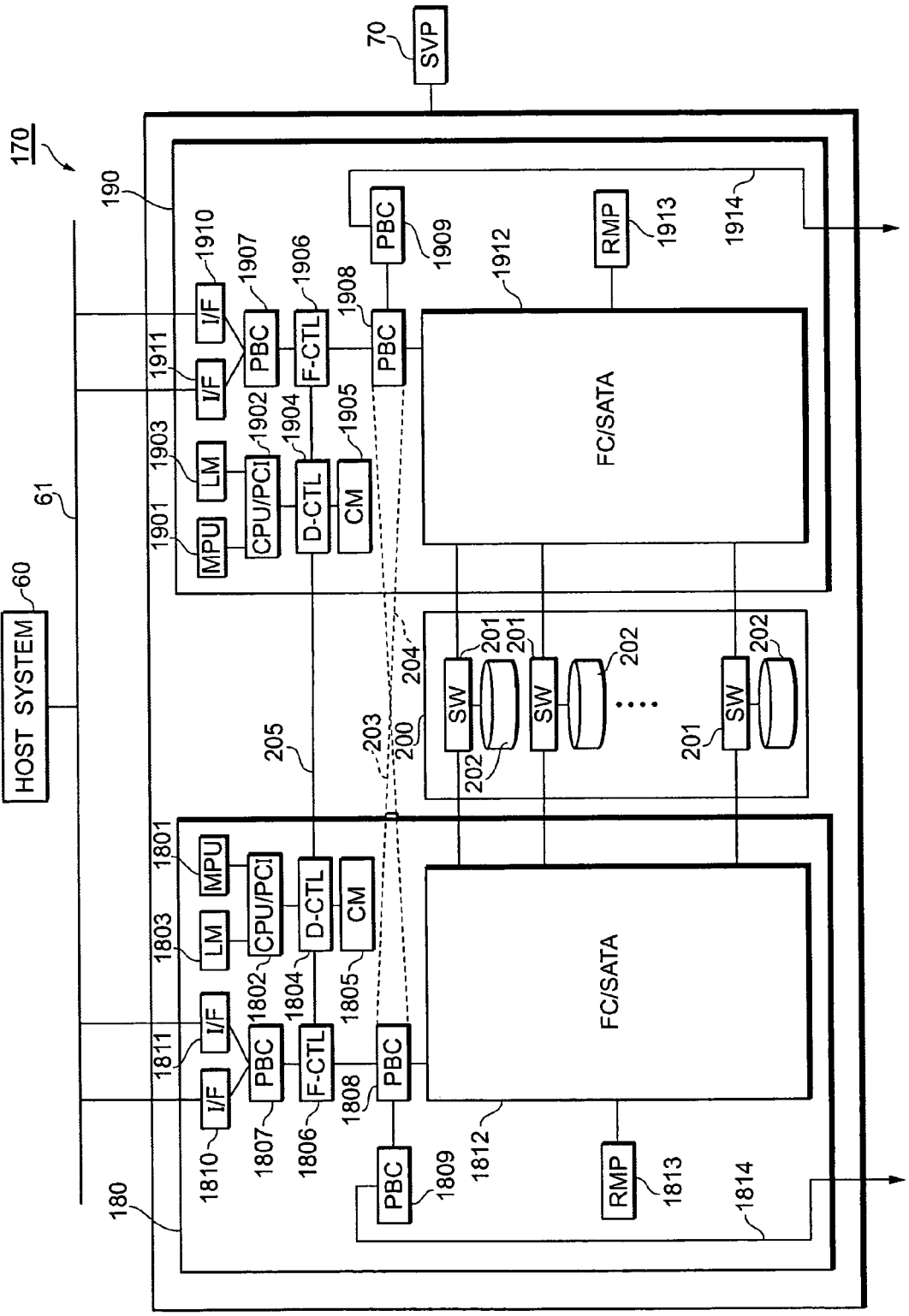
FIG. 14 is a system configuration of a basic chassis of a storage system according to the present embodiment.

Further, in the foregoing explanation, although the basic chassis 20 having a plurality of FC disk drives 51 was exemplified as the basic chassis of the storage system 10, as shown in FIG. 14, a basic chassis 170 having a plurality of SATA disk drives 202 may also be used. In FIG.14, the devices which have the same reference numeral as the devices depicted in FIG. 1 are the same, and the detailed explanation thereof is omitted.

The basic chassis 170 has a plurality of SATA disk drives 202, and controllers 180, 190 for controlling the input and output of data to and from the plurality of SATA disk drives 202. The controllers 180, 190 and the plurality of SATA disk drives 202 are connected via a backboard 200.

The controller 180 has a main processor (MPU) 1801, a CPU/PCI bridge 1802, a local memory (LM) 1803, a data controller (D-CTL) 1804, a cache memory (CM) 1805, an FC controller (F-CTL) 1806, port bypass circuits 1807, 1808, 1809, host interfaces (I/F) 1810, 1811, an FC/SATA converter 1812, a resource management processor (RMP) 1813 and an FC path 1814.

Similarly, the controller 190 has a main processor (MPU) 1901, a CPU/PCI bridge 1902, a local memory (LM) 1903, a data controller (D-CTL) 1904, a cache memory (CM) 1905, an FC controller (F-CTL) 1906, port bypass circuits 1907, 1908, 1909, host interfaces (I/F) 1910, 1911, an FC/SATA converter 1912, a resource management processor (RMP) 1913 and an FC path 1914.

The FC/SATA converter 1812 is connected to even-numbered SATA disk drives 202 via a path switch 201. The FC/SATA converter 1912 is connected to odd-numbered SATA disk drives 202 via a path switch 201. When an expanded chassis is connected to the basic chassis 170, each controller 180, 190 is connected to the expanded chassis via the FC paths 1814, 1914.

Further, the data controllers 1804, 1904 of the respective controllers 180, 190 are connected via a data bus 205, and data transfer is controlled such that the same data is written in duplicate in two cache memories 1805, 1905.

The port bypass circuits 1808, 1908 are connected with two alternate paths 203, 204, and, for instance, are configured to realize a fail over to the controller 190 when a failure occurs to the controller 180.

Incidentally, the resource management processors (RMP2) 1813, 1913 are loaded with main firmware 2008.

The storage system 10 may be configured from a single piece of basic chassis 170, or configured by connecting one or a plurality of expanded chassis 80 or expanded chassis 120 to the basic chassis 170. In either case, the method of automatically download the main firmware is the same as the method described above.

According to the present embodiment, when the components deployed as service parts of the controllers 30, 40, 180, 190, enclosures 90, 100 or routers 130, 140 are replaced, if the revision of the main firmware 2001, 2004, 2008 is old, since this can be automatically replaced with the main firmware 2001, 2004, 2008 of new revision, maintenance management is facilitated. Further, since the main firmware 2001, 2004, 2008 will be managed together with the main micro source file 3002 of the main processors 30, 406, 1801, 1901, maintenance management is facilitated.

What is claimed is:

1. A storage system, comprising:
a base chassis including a first storage device, a controller for responding to an I/O request from a host system and controlling the input and output of data to and from said first storage device, a resource management processor for managing a chassis resource in the said basic chassis, and a system drive for storing a revision of main firmware of said resource management processor; and
one or more expanded chassis each including a second storage device, a first Fiber Channel/Serial Advanced Technology Attachment (FC/SATA) converter connected to said second storage device, and a second FC/SATA converter connected to said second storage device,
wherein said resource management processor monitors the temperature of said controller,
wherein said controller performs a first comparative determination for comparing a revision of the main firmware installed in said resource management processor and the revision of the main firmware of said resource management processor stored in said system drive and, upon determining that the revision of the main firmware installed in said resource management processor is older than the revision of the main firmware of said resource management processor stored in said system drive, renews the revision of the main firmware installed in said resource management processor to the revision of the main firmware of said resource management processor stored in said system drive,
wherein said controller performs a second comparative determination for comparing a revision of main firmware installed in said first FC/SATA converter and a revision of main firmware of said first FC/SATA converter stored in said system drive, and
wherein said controller, upon determining that the revision of the main firmware installed in said first FC/SATA converter is older than the revision of the main firmware of said first FC/SATA stored in said system drive, directs blocking of said first FC/SATA converter, switches an allocation destination of said second storage device from said first FC/SATA converter to said second FC/SATA converter, switches from a first connection path with said first FC/SATA converter to a second connection path with said second FC/SATA converter, renews the revision of the main firmware installed in said first FC/SATA converter to the revision of the main firmware of said first FC/SATA converter stored in said system drive, switches the allocation destination of said second storage device back to said first FC/SATA converter, and switches back from the second connection path with said second FC/SATA converter to the first connection path with said first FC/SATA converter.

2. The storage system according to claim 1, further comprising a local memory, and
wherein a main micro source file of said controller is stored in said system drive together with the revision of the main firmware of said resource management processor stored in said system drive, and said controller loads said main firmware of said resource management processor stored in said system drive, together with said main micro source file, in said local memory.

3. The storage system according to claim 2, wherein said controller performs said first comparative determination at a time when said main micro source file stored in said system drive is renewed together with said main firmware installed in said resource management processor with said storage system in an online state.

4. The storage system according to claim 1, wherein said controller performs said first comparative determination at a time when a main power source is turned on.

5. The storage system according to claim 1, wherein said controller performs said first comparative determination at a time when a first chassis is added with said storage system in an online state.

6. The storage system according to claim 1, wherein said controller performs said first comparative determination at a time when said controller is replaced with said storage system in an online state.

7. The storage system according to claim 1, wherein said controller performs said first comparative determination at a time when said resource management processor is replaced with said storage system in an online state.

8. The storage system according to claim 1, wherein said controller performs said second comparative determination at a time when said first FC/SATA converter is replaced with said storage system in an online state.

9. The storage system according to claim 1, wherein said controller periodically repeats said first comparative determination with said storage system in an online state.

10. An automatic renewal method of firmware of a storage system, the method comprising:
acquiring a revision of main firmware installed in a resource management processor for performing resource management in a basic chassis of the storage system;
acquiring a revision of main firmware of said resource management processor stored in a system drive in the basic chassis of said storage system;
performing a first comparative determination comparing the revision of the main firmware installed in said resource management processor and the revision of the main firmware of said resource management processor stored in said system drive;
renewing the main firmware installed in said resource management processor to the main firmware of said resource management processor stored in said system drive upon determining that the revision of the main firmware installed in said resource management processor is older than the revision of the main firmware of said resource management processor stored in said system drive;
acquiring a revision of main firmware installed in a first Fiber Channel/Serial Advanced Technology Attachment (FC/SATA) converter in a first expanded chassis of one or more expanded chassis of the storage system and connected to a storage device of the first expanded chassis;
acquiring a revision of main firmware of said first FC/SATA converter stored in the system drive;
performing a second comparative determination comparing the revision of the main firmware installed in said first FC/SATA converter and the revision of the main firmware of said first FC/SATA converter stored in said system drive; and
upon determining that the revision of the main firmware installed in said first FC/SATA converter is older than the revision of the main firmware of said first FC/SATA converter stored in said system drive, directing blocking of said first FC/SATA converter, switching an allocation destination of said storage device from said first FC/SATA converter to a second FC/SATA converter in the first expanded chassis and connected to said storage device, switching from a first connection path with said first FC/SATA converter to a second connection path with said second FC/SATA converter, renewing the main firmware installed in said first FC/SATA converter to the main firmware of said first FC/SATA converter stored in said system drive, switching the allocation destination of said storage device back to said first FC/SATA converter, and switching back from the second connection path with said second FC/SATA converter to the first connection path with said first FC/SATA converter.

11. The automatic renewal method of firmware of a storage system according to claim 10, wherein said first comparative determination is performed at a time when a main power source is turned on.

12. The automatic renewal method of firmware of a storage system according to claim 10, wherein said first comparative determination is performed at a time when a first chassis is added with said storage system in an online state.

13. The automatic renewal method of firmware of a storage system according to claim 10, wherein said first comparative determination is performed at a time when said controller is replaced with said storage system in an online state.

14. The automatic renewal method of firmware of a storage system according to claim 10, wherein said second comparative determination is performed at a time when said FC/SATA converter is replaced with said storage system in an online state.

15. The automatic renewal method of firmware of a storage system according to claim 10, wherein said first comparative determination is periodically repeated with said storage system in an online state.

* * * * *